United States Patent [19]

Dezawa et al.

[11] Patent Number: 4,486,496
[45] Date of Patent: Dec. 4, 1984

[54] MAGNETIC RECORDING MEDIUM

[75] Inventors: Shin-ichiro Dezawa; Goro Akashi; Tatsuji Kitamoto, all of Kanagawa, Japan

[73] Assignee: Fuji Photo Film Co., Ltd., Kanagawa, Japan

[21] Appl. No.: 382,337

[22] Filed: May 26, 1982

[30] Foreign Application Priority Data

May 26, 1981 [JP] Japan ................. 56-79684

[51] Int. Cl.$^3$ .......................... G11B 5/68; G11B 5/70; B32B 5/16
[52] U.S. Cl. ................. 428/328; 360/134; 360/135; 360/136; 427/128; 427/131; 252/62.54; 428/329; 428/694; 428/900
[58] Field of Search ................. 360/134–136; 428/693, 694, 692, 900, 328, 329; 252/62.54; 427/128, 131

[56] References Cited

U.S. PATENT DOCUMENTS

| | | | |
|---|---|---|---|
| 3,023,166 | 2/1962 | Duinker | 428/900 |
| 3,117,065 | 1/1964 | Wootten | 360/134 |
| 3,185,775 | 3/1965 | Camras | 360/134 |
| 4,135,016 | 1/1979 | Ogawa | 428/900 |
| 4,171,408 | 10/1979 | de Leeuw | 428/693 |
| 4,210,946 | 7/1980 | Iwasaki | 427/131 |
| 4,277,809 | 7/1981 | Fisher | 427/131 |
| 4,351,010 | 9/1982 | Arai | 360/134 |
| 4,355,072 | 10/1982 | Mateika | 428/693 |
| 4,425,401 | 1/1984 | Ido | 428/900 |

FOREIGN PATENT DOCUMENTS 5586103 6/1980 Japan .

Primary Examiner—Ellis P. Robinson
Attorney, Agent, or Firm—Sughrue, Mion, Zinn, Macpeak, and Seas

[57] ABSTRACT

A magnetic recording medium which comprises a non-magnetic support having thereon a magnetic layer containing plate-shaped magnetic particles which have axes of easy magnetization perpendicular to their respective plate planes dispersed in a binder, the magnetic particles each having a multiple magnetic domain structure and having a particle diameter equal to or longer than the recorded effective shortest wavelength.

6 Claims, 4 Drawing Figures

MAGNETIC RECORDING MEDIUM

FIELD OF THE INVENTION

The present invention relates to a magnetic recording medium, more particularly, to a magnetic recording medium which provides a high output level, a high signal density with a high signal to noise ratio, which is useful for perpendicular magnetic recording.

BACKGROUND OF THE INVENTION

Materials which have high coercive forces (Hc), and smooth surfaces have been regarded as good media for high density recording. As recording media for this purpose, recording media based on magnetic powders and recording media based on thin metal films formed by the evaporation, metal plating or other processes have been used. However, both types of recording media suffer from a lack of stability because they are liable to be oxidized, and attempts to put them to practical use have been unsuccessful.

In recent years, to attain high output levels in short wavelength recording systems, recording systems which utilize (1) the vertical component of the magnetic field used for recording or (2) perpendicular magnetic recording have been proposed.

Although these systems are excellent in principle, excellent recording media useful therein are not available.

Specifically, using a magnetic material made of conventional needle-shaped magnetic particles oriented at random has been proposed. However, such a material does not provide sufficient output due to the low relative density of the component oriented in the vertical direction.

Further, the use of needle-shaped magnetic particles oriented perpendicular to the plane of the magnetic layer has been proposed, and a number of methods for orienting such magnetic particles have also been proposed. However, sufficient orientation has not been achieved with these methods as the initially vertically oriented needle-shaped particles tilt down toward a plane parallel to the surface of the magnetic layer upon contraction of the magnetic coating in its thickness direction on drying.

In addition, recording media comprising a thin metal film formed by sputtering or evaporation techniques for perpendicular magnetic recording have been proposed. However, such as insufficient in terms of chemical stability, magnetic head abrasion resistance and durability.

In the present invention, the term "perpendicular magnetic recording" refers to the recording process in which a magnetic head as illustrated in FIG. 1 is used; such a process is described in *Television Gakkaishi*, Vol. 32, No. 5, P399 (1978) or *IEEE Transactions on Magnetics* 1980 (1) Vol. MAG-16, November 1 P71.

On the other hand, the expression "the recording system utilizing the vertical component of magnetization" refers to the recording system in which the vertical component of a magnetic field created by a ring head on the surface of a magnetic layer, as illustrated in FIG. 2, is utilized; such a system is described in *IEEE Transactions on Magnetics* Vol. 15, No. 6, November 1979. When a head having a narrow gap is used, recording is, in general, carried out very efficiently.

With the invention of solving these problems, we developed a magnetic recording medium which contains plate-shaped magnetic particles whose major planes are oriented parallel to the surface of the magnetic layer, which they are in, that is to say, whose axes of easy magnetization are aligned perpendicular to the surface of magnetic layer which they are in. Such a recording medium provides a higher output level and a higher signal to noise ratio in the short wavelength recording as compared with conventional recording media. However, the values thereof were still not high enough.

As a result of examining the causes of such deficiencies it turned out that this is mainly due to the fact that when the wavelength of a wave to be recorded is smaller than size of the magnetic particles involved, magnetization induced in an individual magnetic particle entirely or partially counteracts the magnetization on another individual particle due to the single domain structure which the magnetic particles have, as illustrated in FIG. 3(B) hereinafter, and only the slight residual magnetization can contribute to the reproduction output.

The development of plate-shaped magnetic particles having smaller sizes may be one way to solve this problem. However, this is not advisable because of undesirable side effects, e.g., fine granulation results in a reduced dispersibility, a reduced orientation and, from the industrial view, a lowering of filtration efficiency in washing.

SUMMARY OF THE INVENTION

The object of the present invention is to overcome the above and is attained by employing plate-shaped magnetic particles with a multiple magnetic domain structure.

That is, a magnetic recording medium which provides a high output level and a high signal to noise ratio in short wavelength recording and which contains magnetic particles produced industrially with excellent productivity and having high dispersibility and orientation can be obtained by employing a magnetic recording medium which has a magnetic layer which compresis plate-shaped magnetic particles having a means particle diameter equal to or longer than the recorded effective shortest wavelength ($\lambda c$) and which have a multiple magnetic domain structure such that the plate planes of the individual magnetic particles may be oriented substantially parallel to the surface of the magnetic layer.

The expression "recorded effective shortest wavelength ($\lambda c$)" includes wavelength corresponding to the carrier frequency in the FM modulation system, to the upper frequency limit of a recording band in the bias recording or direct recording system and to the frequency employed in patterning at the maximum frequency in digital recording (e.g., all one in NRZ). In summary, the effective shortest wavelength can be determined by the maximum frequency of a signal spectrum to be recorded.

Figure 1:
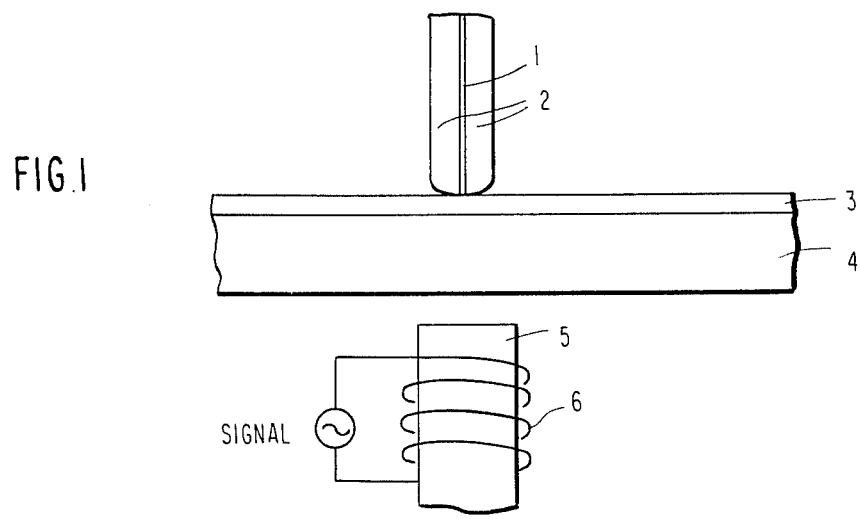
FIG. 1 is a schematic illustration of a recording head and a recording medium employed in perpendicular magnetic recording.
Figure 2:
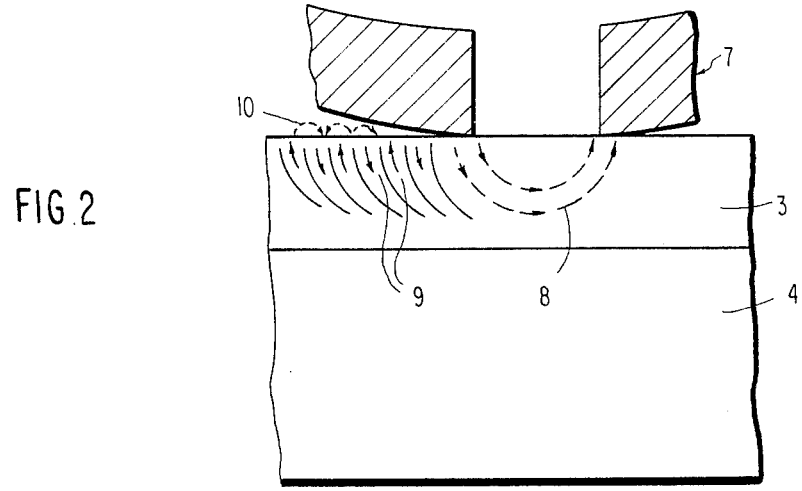
FIG. 2 is a schematic illustration of a recording system utilizing the vertical component of a magnetic field.

In the Figures, numeral 1 designates a main pole for perpendicular magnetic recording, numeral 2 a support for the main head, numeral 3 a magnetic layer, numeral 4 a support for the magnetic layer, numeral 5 an auxiliary head for the perpendicular magnetic recording, numeral 6 a signal generating coil, numeral 7 a part of a ring head, numeral 8 a magnetic field created by the ring head, numeral 9 a recorded magnetic field, numeral 10 leakage flux, numeral 11 a magnetic field of a recording signal wherein the oblique line portion is an upward magnetic field and the blank portion is a downward magnetic field, (11-1 represents a long wavelength recording signal and 11-2 a short wavelength recording signal), numeral 12 a plate-shaped magnetic particle (12-1 represents a particle magnetized downward and 12-2 a particle magnetized upward), numeral 13 a difference in numbers of magnetic particles between particles magnetized upward and particles magnetized downward; the difference can be observed externally as residual magnetization (13a represents the case of long wavelength recording, 13b the case of short wavelength recording using particles having a single magnetic domain structure and 13c the case of short wavelength recording using particles having a multiple magnetic domain) and numeral 14 a magnetic wall.

DETAILED DESCRIPTION OF THE INVENTION

The effects of the present invention will be described with reference to FIG. 3.

Figure 3:
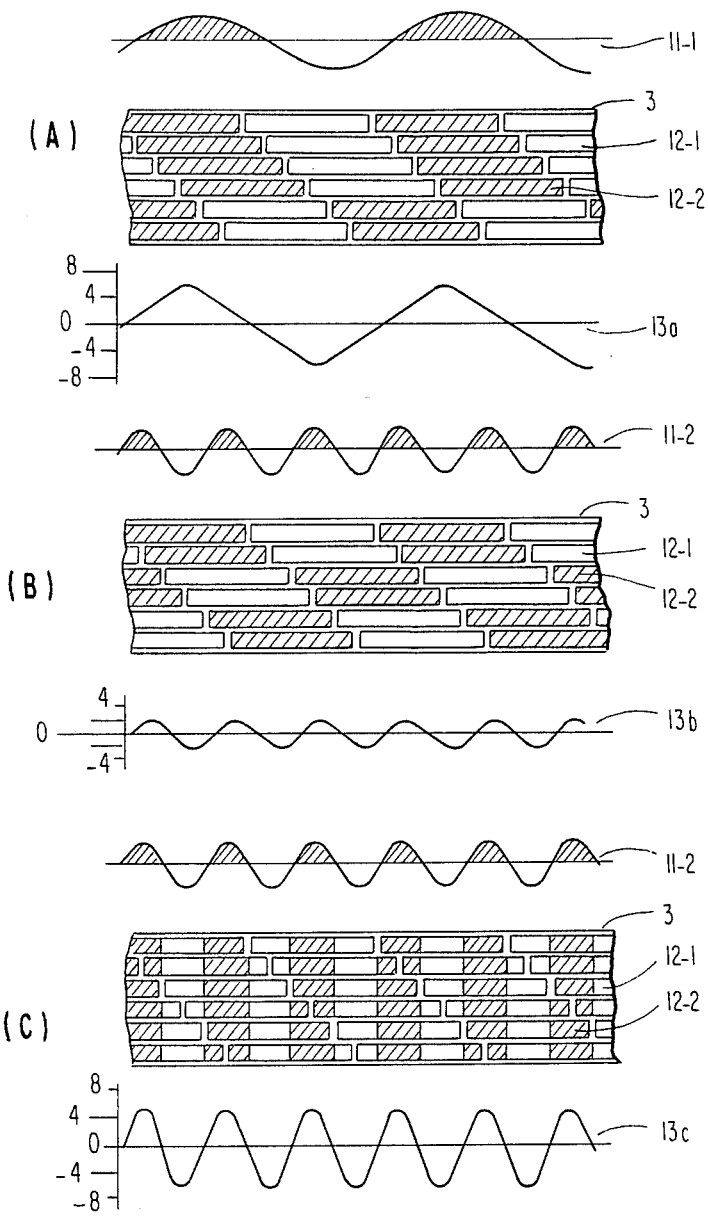
FIG. 3 present schematic illustrations of various modes of magnetizations induced in recording media containing plate-shaped magnetic particles.

In FIG. 3, magnetic layers comprising plate-shaped magnetic particles are illustrated schematically. FIG. 3(A) corresponds to the case where a wavelength about twice as long as the mean diameter of the particles is recorded where as both FIG. 3(B) and FIG. 3(C) represent cases where wavelengths about two-thirds as long as the mean diameter of the particles are recorded.

In the case of recording sufficiently long wavelengths, all of particles in the thickness direction can be magnetized in the same direction, as illustrated in FIG. 3(A), whereby a high output level can be produced. On the other hand, in the thickness direction some particles are magnetized in such directions as to counteract the magnetizations of other particles, as illustrated in FIG. 3(B), whereby the output is reduced. However, as illustrated in FIG. 3(C), a high output level equivalent to that obtained in the case of FIG. 3(A) can be produced if the plate-shaped magnetic particles have a multiple magnetic domain structure.

The expression "plate-shaped magnetic particles" in the present invention is intended to include particles which have axes of easy magnetization in the direction perpendicular to individual plate planes of the particles and does not include those which have axes of easy magnetization only in the direction parallel to individual major plate planes of the particles. Such plate-shaped particles are disclosed in Japanese Patent Ambication (OPI) Nos. 86103/80 and 60002/81 (the term "OPI" as used herein refers to a "published unexamined patent application") and Japanese Patent Publication Nos. 25796/72 and 13909/67.

Figure 4:
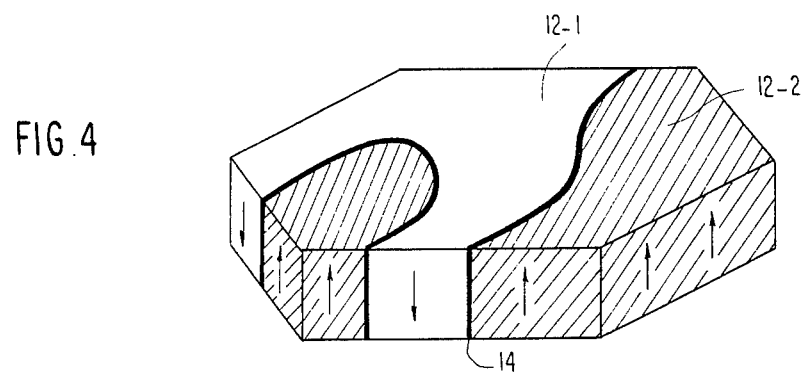
FIG. 4 is a schematic illustration of an example of magnetic domain structures which plate-shaped magnetic particles having a multiple magnetic domain structure can have.

Only plate-shaped magnetic particles having a multiple magnetic domain structure among plate-shaped magnetic particles having various kinds of magnetic domain structures are employed in the present invention. The term multiple magnetic domain structure used herein means that a few magnetic domains differing from one another in polarity of magnetization oriented in the direction perpendicular to the plate plane can exist in the individual plate-shaped magnetic particles, as illustrated in FIG. 4. It does not matter whether actual magnetization arises from a multiple magnetic domain due to magnetization of some magnetic particles aligned parallel to one another and non-parallel to those of other magnetic particles, or a single magnetic domain due to magnetizations of all magnetic particles being aligned parallel to one another.

Magnetic materials which can be employed in the present invention are those which satisfy the following relation:

$$K/2\pi M_s^2 \geq 1$$

wherein K represents the magnetic anisotropy constant in the direction perpendicular to the major plate plane, $M_s$ represents saturation magnetization, and $\pi$ is the ratio of circumference of a circle to its diameter. It is further desirable for these materials to have magnetic walls whose thicknesses are one-thirds or less the mean diameter of the particle. The thickness of a magnetic wall $\sigma$ is represented by the relation $\sigma = \sqrt{A.K.}$, wherein A is the exchange energy constant and K is as earlier described. The above relations are discussed in detail in, for example, *Kyojiseitai no Butsuri* (The Physics of Ferromagnetic Substances), 8th edition, section 9, Shokabo, Tokyo (1970). The magnetic domain wall is discussed in detail in "Ferrites", J. Smit and H.P.J. Wijn; Philips Technical Library.

Such magnetic materials include barium ferrite and other hexagonal ferrites represented by the following general formulae: $MO \cdot 6Fe_2O_3$, $BaM_2Fe_{16}O_{27}$, $Ba_2M_2Fe_{12}O_{22}$, $Ba_3M_2Fe_{24}O_{41}$ and the like which are known materials. In the above formulae, M represents a divalent metal ion, and metals from Groups II, IV, V, VIa and VIb of the Periodic Table can be used. Specific examples of such elements include Fe, Mn, Co, Ni, Zn, Mg, Ca, Cu, Si, Ge, Ti, Zr, P, $(Li^+ + Fe^{3+})/2$ and the like. The above ferrites may contain such metal ions up to about 20 atm % in place of the Ba ions and/or the Fe ions.

Many other hexagonal ferrites can also be employed in the present invention.

The plate-shaped magnetic particles employed in the present invention do not have any particular restriction on their size. However, the size should be selected depending on, as already described, the recorded effective shortest wavelength, the thickness of the magnetic wall and the required signal to noise ratio. In general, particles having a mean diameter of 0.1 μm to 20 μm are employed, and those which have a mean diameter of 0.5 μm to 10 μm are especially effective. Also, particles having a ratio of diameter to thickness of from about 2:1 to about 30:1, preferably from 4:1 to 30:1, can be generally used. The coercive force thereof is determined depending upon the recording purpose. However, generally, a coercive force in the range from 300 Oe to 3,000 Oe is preferred.

One attempt to use magnetic materials as described above is reported in, for example, U.S. Pat. No. 3,023,106. However, such discloses only of a conventional recording system since the axes of easy magnetization inherent in the magnetic particles are oriented to align parallel to the surface of the magnetic layer. Further, according to our investigations such materials only provide axes of easy magnetization with insufficient orientation in planes parallel to the surface of the magnetic layer because a "tilting" effect takes place as per the earlier-described case of vertical orientation of needle-shaped magnetic particles, i.e., the plates "tilt" down toward planes parallel to the surface of the magnetic layer during drying.

In accordance with one embodiment of the present invention, plate-shaped magnetic particles are dispersed in a binder and a solvent, optionally together with additives as conventionally used depending upon the end use of the element. Such additives are disclosed in, for example, U.S. Pat. No. 4,135,016. Thus prepared magnetic coating is coated on a non-magnetic support and, subsequently, a magnetic field is applied to the coated layer in the direction perpendicular to the coated layer to orient the axis of easy magnetization along the direction of the magnetic field and then the resulting layer is dried. Thereafter, the surface of the magnetic layer is optionally subjected to a smoothening processing as disclosed in U.S. Pat. No. 4,135,016. The higher the smoothness, the better the S/N ratio, but excessive smoothness may sometimes adversely affect the running properties and the durability of magnetic recording medium.

Upon drying the magnetic layer undergoes contraction, whereby a strong force is generated in the thickness direction and the plates are tilted downward by the force in a direction such that they become closer to parallel to the surface of the magnetic layer and consequently, the orientation of magnetization in the direction perpendicular to the surface of the magnetic layer is further enhanced. Due to this orientation effect, orientation using an applied magnetic field is not always necessarily carried out. The drying can be effected under conditions as disclosed in U.S. Pat. No. 4,135,016.

The binders, solvents and non-magnetic supports which can be employed in the present invention include those conventionally used in this art as disclosed in U.S. Pat. No. 4,135,016.

Examples of the binders include thermoplastic resins, thermosetting resins and reaction hardenable resins.

Examples of the solvents include both polar and nonpolar solvents, such as esters, ethers, ketones, alcohols, aliphatic hydrocarbons, aromatic hydrocarbons and the like, for example, methyl ethyl ketone, methyl isobutyl ketone (MIBK), toluene, cyclohexanone; dimethylformamide, tetrahydrofuran, ethyl acetate, propyl acetate, butyl acetate, etc. these solvents are often used in the form of a mixture of two or more thereof. Water is used as a solvent when water soluble resins are used as a binder.

Optional additives include conventional dispersing agents, a lubricants, carbon black, abrasives and the like, and they are added depending upon the end use of the recording material produced.

As the support, aluminum, glass, polyesters or cellulose derivatives are commonly used. However, the support of the present invention is not limited to these materials.

The present invention will now be illustrated in more detail by reference to the following Example and Comparative Examples. However, the present invention should not be construed as being limited to the following Example in any way.

EXAMPLE 1

Barium ferrite having a multiple magnetic domain structure, which had a mean diameter of 3 μm, a coercive force of 1730 Oe, a σs value of 59.2 emu/g and a thickness of 0.2 μm was dispersed per the formula in Table 1 using a glass bead mill. The resulting dispersion was filtered through a filter having an average pore size of 5 μm and then in a thickness of 5 μm on a 20 μm-thick polyethylene terephthalate film. Before the coated layer was dried to any extent, it was oriented by being passed between gap between the N-pole and the S-pole of an electromagnet for 15 seconds. The strength of the magnetic field applied was 3,000 Gauss and the direction thereof was perpendicular to the surface of the polyethylene terephthalate film. Thereafter, the element was dried at 100° C. for one minute and subsequently subjected to supercalendering to smoothen the surface thereof. It was then slit into tapes of a width of ½ inch. The thus obtained tape was identified Sample I.

For purposes of comparison with Sample I, the following Comparative Samples were made.

COMPARATIVE EXAMPLE 1

A tape was made in the same manner as in Example 1 except that barium ferrite having a mean particle diameter of 1.1 μm, a mean thickness of 0.12 μm, an Hc of 1,299 Oe and a σs of 56.0 emu/g was employed as the plate-shaped magnetic particles instead of the barium ferrite having the multiple magnetic domain structure. The thus obtained tape was identified Comparative Sample I.

COMPARATIVE EXAMPLE 2

Another tape was made in the same manner as in Example 1 except that cobalt modified magnetic iron oxide (needle-shaped magnetic particles) having a mean axis length of 0.3 μm and a ratio of the length to the diameter of about 15:1 was employed as a magnetic material in the coating composition instead of the plate-shaped barium ferrite. Further, the mixing proportions of the ingredients in the coating composition were changed as shown in Table 2. In addition, the orientation using an applied magnetic field before drying was not carried out. The thus obtained tape was identified Comparative Sample II.

The static characteristics and magnetic properties of Sample I are shown in Table 3 together with those of Comparative Samples I and II.

The magnetic properties of the tapes were examined using the recording systems later described below. In both systems A and B, high output levels were obtained using Sample I of the present invention. Further, in system B a high signal to noise ratio was obtained using Sample I of the present invention.

TABLE 1

|  | Parts by Weight |
|---|---|
| Plate-shaped Magnetic Particles | 100 |
| Alcohol Modified Vinyl Chloride-Vinyl Acetate Copolymer (VAGH, a product of Union Carbide Co., Ltd.) | 7 |
| Polyurethane (Nipporan 2301, a product of Nippon Polyurethane Co., Ltd.) | 7 |
| Polyisocyanate (Coronate L, a product of Nippon Polyurethan Co., Ltd.) | 2 |
| Soya Lecithin | 0.5 |

TABLE 1-continued

| | Parts by Weight |
|---|---|
| MIBK | 300 |

Note
Polyisocyanate was added after completion of the dispersing.

TABLE 2

| | Parts by Weight |
|---|---|
| Needle-shaped Magnetic Particles | 100 |
| Alcohol Modified Vinyl Chloride-Vinyl Acetate Copolymer | 10 |
| Polyurethane (Nipporan 2301, a product of Nippon Polyurethan Co., Ltd.) | 3 |
| Soya Lecithin | 1 |
| MIBK | 300 |

Note
Polyisocyanate was added after completion of the dispersing.

RECORDING SYSTEM A: PERPENDICULAR MAGNETIC RECORDING

A magnetic head as illustrated in FIG. 1 was used, i.e., a main pole which was made by sealing, in low melting point glass, Permalloy evaporated in the form of a 0.8 μm-thick film on a glass slide and polishing it till its width became ½ inch, and an auxiliary head which was made of Mn-Zn ferrite having a width of ½ inch and a thickness of 5 mm, were used.

Recorded wavelengths were adjusted to 4 μm, 1 μm and 0.3 μm by setting the running speed of the tape at 4.25 cm/sec. and employing recording frequencies of 10 KHz, 40 KHz and 140 KHz, respectively. The recording current was indicated in terms of a relative value of the optimum current at 40 KHz of Comparative Sample II which was referred to 100%. In the Sample I and Comparative Sample I, the output level was not saturated even at the maximum current (150%) of the recording amplifier and, therefore, the data of these samples shown in Table 3 are those obtained at 150% recording current.

Reproduction was carried out using a ferrite head having an effective gap length of about 0.2 μm and a track width of 50 μm, and the ratios of the outputs of Sample I and Comparative Sample I to that of Comparative Sample II, respectively, at each recording wavelength were measured.

RECORDING SYSTEM B: RECORDING SYSTEM UTILIZING THE VERTICAL COMPONENT OF MAGNETIZATION

Output measurements were made using a ring head having an effective gap length of about 0.2 μm and a track width of 50 μm using a deck whose head speed was reduced to one-half by remodelling a conventional VHS system and using recording frequencies of 0.7 MHz and 9 MHz so that recording wavelengths could be adjusted to 4 μm, 1 μm and 0.3 μm, respectively. The signal to noise ratio of each sample was measured as a carrier to noise ratio (CN ratio) by passing the output signal through a limiter amplifier, then introducing it into a spectram analyzer, and measuring the level of carrier signal at 4 MHz and the level of noise signal at 3 MHz. The CN ratio is represented as a ratio of these signal levels.

The outputs and the CN ratio for Sample I and Comparative Sample I set forth in Table 3 are relative values evaluated with Comparative Sample II as the standard.

TABLE 3

| Recording System | Recorded Wavelength | | Sample I | Comparative Sample I | Comparative Sample II |
|---|---|---|---|---|---|
| A | | Recording Current | 150 | 150 | 100 |
| | 4 μm | Output | −0.5 | −0.5 | 0 |
| | 1 μm | (db) | 3.0 | 2.0 | 0 |
| | 0.3 μm | | 7.9 | 5.0 | 0 |
| B | | Recording Current | 205 | 210 | 100 |
| | 4 μm | Output | −3.2 | −3.0 | 0 |
| | 1 μm | (db) | 4.3 | 3.1 | 0 |
| | 0.3 μm | | 9.1 | 5.9 | 0 |
| | | CN ratio | +7.5 | +5.9 | 0 |
| Magnetic Properties | Parallel to Layer | Hc | 1210 | 1210 | 755 |
| | | SQ | 0.37 | 0.40 | 0.73 |
| | Perpendicular to Layer | Hc | 1190 | 1200 | 490 |
| | | SQ | 0.70 | 0.65 | 0.22 |

While the invention has been described in detail and with reference to specific embodiments thereof, it will be apparent to one skilled in the art that various changes and modifications can be made therein without departing from the spirit and scope thereof.

What is claimed is:

1. A magnetic recording medium which comprises (a) a non-magnetic support, (b) a magnetic layer containing plate-shaped magnetic particles having a mean particle size of 0.1 μm to 20 μm and a coercive force of 300 to 3,000 oersteads, and satisfying the following relationship $$K/2\pi M_s^2 \geq 1$$

wherein K represents the magnetic anisotropy constant in the direction perpendicular to the individual plate-shaped magnetic particles' major plate plane, $M_s$ represents saturation magnetization, and $\pi$ is the ratio of circumference of a circle to its diameter, and which have axes of easy magnetization perpendicular to their plate planes dispersed in a binder, said plate-shaped magnetic particles each having a multiple magnetic domain structure and having a particle diameter equal to or longer than the recorded effective shortest wavelength.

2. The magnetic recording medium described in claim 1, wherein said plate-shaped magnetic particles which have a multiple magnetic domain structure comprise hexagonal ferrites represented by the following general formulae: $Mo·6Fe_2O_3$, $BaM_2Fe_{16}O_{27}$, $Ba_2M_2Fe_{12}O_{22}$, $Ba_3M_2Fe_{24}O_{41}$, wherein M represents a divalent metal ion and metals from Groups II, IV, V, and VIa of the Periodic Table and, wherein up to about 20 atm % of the barium ions or/and the iron ions may be replaced by other metal ions.

3. The magnetic recording medium described in claim 1 or claim 2, wherein said plate-shaped magnetic particles having multiple magnetic domain structures have a mean particle diameter of 0.5 μm to 10 μm.

4. A magnetic recording medium described in claim 1 wherein said plate-shaped magnetic particles have a ratio of diameter to thickness of from about the 2:1 to about 30:1.

5. The magnetic recording medium described in claim 1 wherein said plate-shaped magnetic particles have a ratio of diameter to thickness of from 4:1 to 30:1.

6. A magnetic recording medium as claimed in claim 1 wherein said particle diameter is longer than the recorded effective shortest wavelength.

* * * * *